US00RE39519E

(19) United States
(12) Reissued Patent
Bak et al.

(10) Patent Number: US RE39,519 E
(45) Date of Reissued Patent: Mar. 13, 2007

(54) MIXED EXECUTION STACK AND EXCEPTION HANDLING

(75) Inventors: Lars Bak, Tranjerg (DK); Robert Griesemer, Palo Alto, CA (US); Urs Hölzle, Palo Alto, CA (US)

(73) Assignee: Sun Microsystems, Inc., Santa Clara, CA (US)

(21) Appl. No.: 10/884,826

(22) Filed: Jul. 1, 2004

Related U.S. Patent Documents

Reissue of:
(64) Patent No.: 6,415,381
Issued: Jul. 2, 2002
Appl. No.: 09/416,373
Filed: Oct. 12, 1999

U.S. Applications:
(63) Continuation of application No. 08/944,335, filed on Oct. 6, 1997, now Pat. No. 6,009,517.

(51) Int. Cl.
*G06F 9/40* (2006.01)

(52) U.S. Cl. ..... 712/244
(58) Field of Classification Search ..... 712/244, 712/245
See application file for complete search history.

(56) References Cited

U.S. PATENT DOCUMENTS 4,399,507 A * 8/1983 Cosgrove et al. ..... 712/219
4,491,912 A * 1/1985 Kainaga et al. ..... 712/243
5,274,817 A * 12/1993 Stahl ..... 718/100
5,475,822 A * 12/1995 Sibigtroth et al. ..... 712/228
5,574,915 A * 11/1996 Lemon et al. ..... 712/220
5,634,046 A * 5/1997 Chatterjee et al. ..... 712/227
5,740,441 A * 4/1998 Yellin et al. ..... 717/134
5,761,491 A * 6/1998 Circello et al. ..... 712/244
5,784,553 A * 7/1998 Kolawa et al. ..... 714/38
5,822,606 A * 10/1998 Morton ..... 712/16
5,884,062 A * 3/1999 Wichman et al. ..... 712/218
5,884,083 A * 3/1999 Royce et al. ..... 717/143
5,925,123 A * 7/1999 Tremblay et al. ..... 712/212
5,937,193 A * 8/1999 Evoy ..... 717/140

* cited by examiner

*Primary Examiner*—David Y. Eng
(74) *Attorney, Agent, or Firm*—Beyer Weaver & Thomas, LLP

(57) ABSTRACT

Systems and methods for implementing an execution stack which stores frames for functions written in multiple programming languages are provided. The frames for functions written in different programming languages may be interleaved on the same execution stack. A data block on the execution stack may be utilized to traverse the execution stack around a frame by storing a stack pointer and frame pointer to a previous frame. Additionally, exceptions may be propagated, with conversion if necessary, through frames on the execution stack that are written in different programming languages.

38 Claims, 16 Drawing Sheets

MIXED EXECUTION STACK AND EXCEPTION HANDLING

Matter enclosed in heavy brackets [ ] appears in the original patent but forms no part of this reissue specification; matter printed in italics indicates the additions made by reissue.

CROSS REFERENCE TO RELATED APPLICATIONS

This is a Continuation application of copending prior application Ser. No. 08/944,335 filed on Oct. 6 1997 now U.S. Pat. No. 6,009,517.

This application is related to U.S. patent application Ser. No. 08/944,331, entitled "Site Specific Message Dispatch in Object-Oriented Systems," U.S. patent application Ser. No. 08/944,735, entitled "Method and Apparatus for Performing Byte-Code Optimization During Pauses," U.S. patent application Ser. No. 08/944,326, entitled "Method and Apparatus for Implementing Multiple Return Sites," U.S. patent application Ser. No. 08/944,332, entitled "Inline Database for Receiver Types in Object-Oriented Systems," U.S. patent application Ser. No. 08/944,334, entitled "Method and Apparatus for Dynamically Optimizing Byte-Coded Programs," U.S. patent application Ser. No.5,933,635, entitled "Method and Apparatus for Dynamically Optimizing Compiled Activations," all filed concurrently herewith, U.S. patent application Ser. No. 08/884,856, entitled "Interpreting Functions Utilizing a Hybrid of Virtual and Native Machine Instructions," filed Jun. 30, 1997, and U.S. patent application Ser. No. 08/885,008, entitled "Interpreter Generation and Implementation Utilizing Interpreter States and Register Caching," filed Jun. 30, 1997, which are all incorporated herein by reference for all purposes in their entirety.

BACKGROUND OF THE INVENTION

The present invention relates to implementations of an execution stack. More specifically, the invention relates to implementing an execution stack for use with functions that may be written in multiple programming languages such as, for example, an execution stack for a Java™ virtual machine.

The Java™ programming language is an object-oriented high level programming language developed by Sun Microsystems and designed to be portable enough to be executed on a wide range of computers ranging from small personal computers up to supercomputers. Computer programs written in Java (and other languages) may be compiled into virtual machine instructions for execution by a Java virtual machine. In general the Java virtual machine is an interpreter that decodes and executes the virtual machine instructions.

The virtual machine instructions for the Java virtual machine are bytecodes, meaning they include one or more bytes. The bytecodes are stored in a particular file format called a "class file" that includes bytecodes for methods of a class. In addition to the bytecodes for methods of a class, the class file includes a symbol table as well as other ancillary information.

A computer program embodied as Java bytecodes in one or more class files is platform independent. The computer program may be executed, unmodified, on any computer that is able to run an implementation of the Java virtual machine. The Java virtual machine is a software emulator of a "generic" computer that is a major factor in allowing computer programs for the Java virtual machine to be platform independent.

The Java virtual machine is commonly implemented as a software interpreter. Conventional interpreters decode and execute the virtual machine instructions of an interpreted program one instruction at a time during execution. Compilers, on the other hand, decode source code into native machine instructions prior to execution so that decoding is not performed during execution. Because conventional interpreters decode each instruction before it is executed repeatedly each time the instruction is encountered, execution of interpreted programs is typically quite slower than compiled programs because the native machine instructions of compiled programs can be executed on the native machine or computer system without necessitating decoding.

Typically, the Java virtual machine will be written in a programming language other than the Java programming language (e.g., the C++programming language). Therefore, execution of a Java program may involve execution of functions written in multiple programming languages. Additionally, the bytecodes themselves may call functions (e.g., system functions for input/output) that are not written in the Java programming language. It is therefore common for an executing Java program to entail the execution of functions that were written in multiple programming languages. It would be desirable to have an execution stack that stores functions written in multiple programming languages. Additionally, it would be beneficial to allow exceptions to be propagated through these functions, with conversion of the exception to the appropriate format where necessary.

The Java virtual machine allows Java programs to dynamically load and execute native methods, where a native method is implemented in a language other than the Java programming language. Native methods often require resources to execute so resources may be allocated and deallocated each time a native method is called. However, resource allocation and deallocation may be very time consuming and the continual allocation and deallocation of resources may result in a significant decrease in efficiency of the interpreted program. Therefore, it would be desirable to provide more efficient techniques of resource allocation and deallocation.

Accordingly, there is a need for techniques for implementing an execution stack capable of holding function activations for functions implemented in different programming languages, and in particular allow exceptions to be propagated through these functions and the corresponding activations. Additionally, there is a need to provide interpreters that are more efficient in the way resources are allocated and deallocated so that execution speed may be increased.

SUMMARY OF THE INVENTION

In general, embodiments of the present invention provide innovative systems and methods for implementing an execution stack that stores frames for functions written in multiple programming languages. Frames for functions written in multiple programming languages may be stored on the same execution stack utilizing an entry frame (or data block) that stores pointers to a previous frame on the execution stack for a function written in the same programming language. The entry frame allows the execution stack to be traversed "around" frames for functions written in other programming languages and exceptions may be propagated through the execution stack for handling by the appropriate exception handler, even when the functions were written in different programming languages and the format of the exceptions are different. Additionally, resources may be allocated upon entering a function written in one programming language (e.g., the Java programming language) so that the resources will be available for any subsequent functions (e.g., native) in other programming languages. The resources may then be deallocated once when the calling function terminates, thereby increasing the efficiency of resource allocation and deallocation. Several embodiments of the invention are described below.

In one embodiment, a computer implemented method for implementing an execution stack that stores frames for functions written in multiple programming languages is provided. A first frame for a function written in a first programming language may be stored on the execution stack. When the first function calls a second function written in a second programming language, a data block may be stored on the execution stack before a second frame for the second function. The data block includes at least one pointer to a previous frame on the execution stack written in the first programming language. In preferred embodiments, the data block stores a stack pointer and a frame pointer to the previous frame on the execution stack, where the stack pointer and frame pointer were stored in local storage (e.g., thread local storage).

In another embodiment, a computer implemented method for implementing an execution stack that stores frames for functions written in multiple programming languages is provided. A first frame for a function written in a first programming language may be stored on the execution stack. When the first function calls a second function written in a second programming language, at least one pointer to the first frame on the execution stack may be stored in local storage (e.g., thread local storage). The at least one pointer may be a stack pointer and a frame pointer. Subsequently, when a third function written in the first programming language is called, a data block may be stored on the execution stack before a third frame for the third function. The data block may store the at least one pointer to the first frame on the execution stack that were stored in local storage so that the data block provides a way around the second frame on the execution stack. In preferred embodiments, the first programming language is the Java programming language.

In another embodiment, a data structure stored by a computer readable medium for implementing an execution stack is provided. A first frame is stored on the execution stack for a first function written in a first programming language. A second frame is stored on the execution stack for a second function written in a second programming language. On the execution stack above the second frame on the execution stack, a data block is stored which includes at least one pointer to the first frame on the execution stack. In a preferred embodiment, the data block stores a stack pointer and a frame pointer to the first frame.

Other features and advantages of the invention will become readily apparent upon review of the following detailed description in association with the accompanying drawings.

DETAILED DESCRIPTION OF PREFERRED EMBODIMENTS

Definitions

Function—A software routine (also called a subroutine, procedure, member function, and method).

Frame (or activation frame, activation record)—A record that is stored on the execution stack for a function to store information for execution of the function, such information may include state variables, local variables and an operand stack.

Execution stack—A stack utilized during program execution to store frames for functions in their sequential calling order. When a function ("callee") is called, a frame for the function is pushed on the execution stack. Subsequently, when the function terminates, the frame is popped off the stack and the function ("caller") for the frame on the top of the execution stack resumes execution.

Operand stack—A stack utilized to store operands for use by machine instructions during execution.

External code—Computer code that is written in a programming language other than a specific programming language (e.g., the Java programming language). For example, the Java virtual machine may be written in the C++programming language and the Java virtual machine could be deemed external code in reference to the Java code of a program that is being interpreted. External code include native methods.

Native methods—Functions that are written in a programming language other than the Java programming language. Native methods may be called by a Java program that causes them to be dynamically loaded and executed. Additionally, native methods may call functions written in the Java programming language.

Overview

In the description that follows, the present invention will be described in reference to a preferred embodiment that implements an execution stack for a Java virtual machine that executes a Java program (e.g. bytecodes). In particular, examples will be described in which the Java virtual machine is written in the C++programming language. However, the invention is not limited to any particular language, computer architecture, or specific implementation. Therefore, the description of the embodiments that follow is for purposes of illustration and not limitation.

Figure 1:
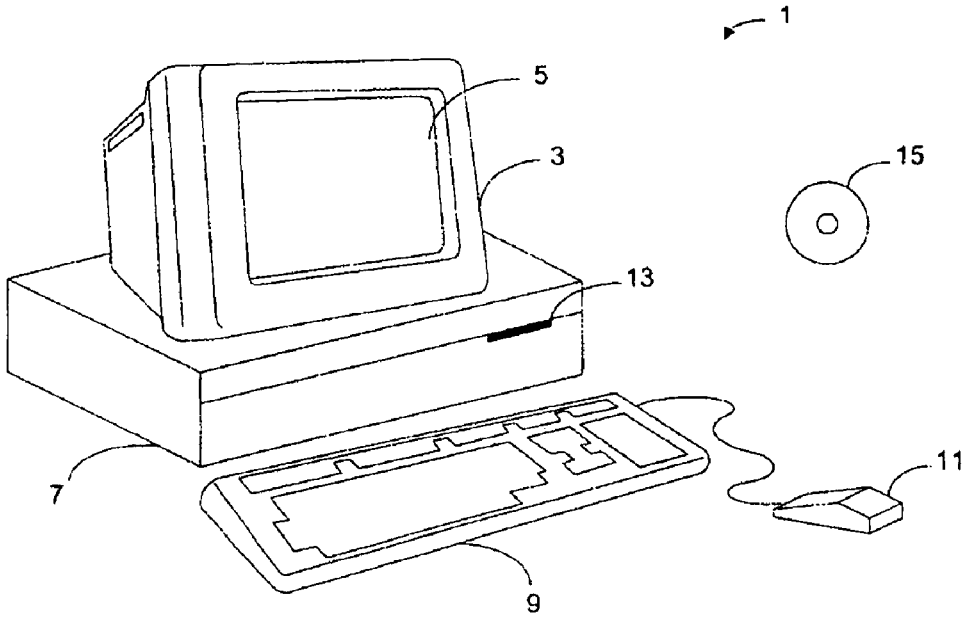
FIG. 1 illustrates an example of a computer system that may be utilized to execute the software of an embodiment of the invention.

FIG. 1 illustrates an example of a computer system that may be used to execute the software of an embodiment of the invention. FIG. 1 shows a computer system 1 that includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the invention, data for use with the invention, and the like. Although the CD-ROM 15 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 2:
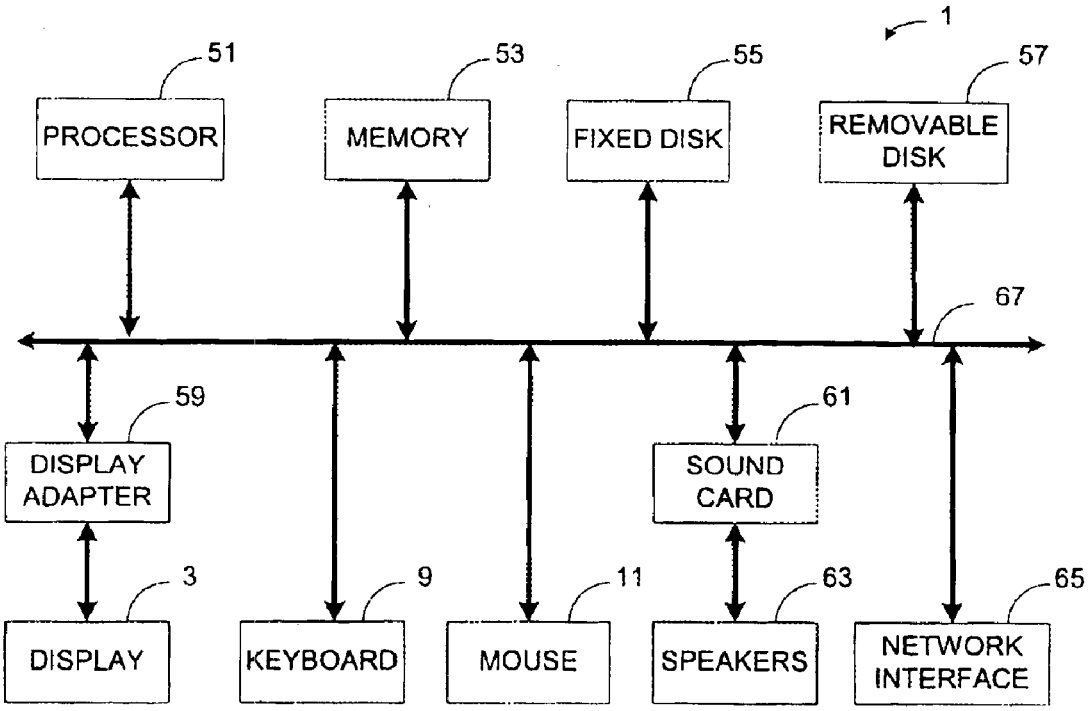
FIG. 2 shows a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 1. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention may include additional or fewer subsystems. For example, another computer system could include more than one processor 51 (i.e., a multi-processor system), or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems may also be utilized.

Figure 3:
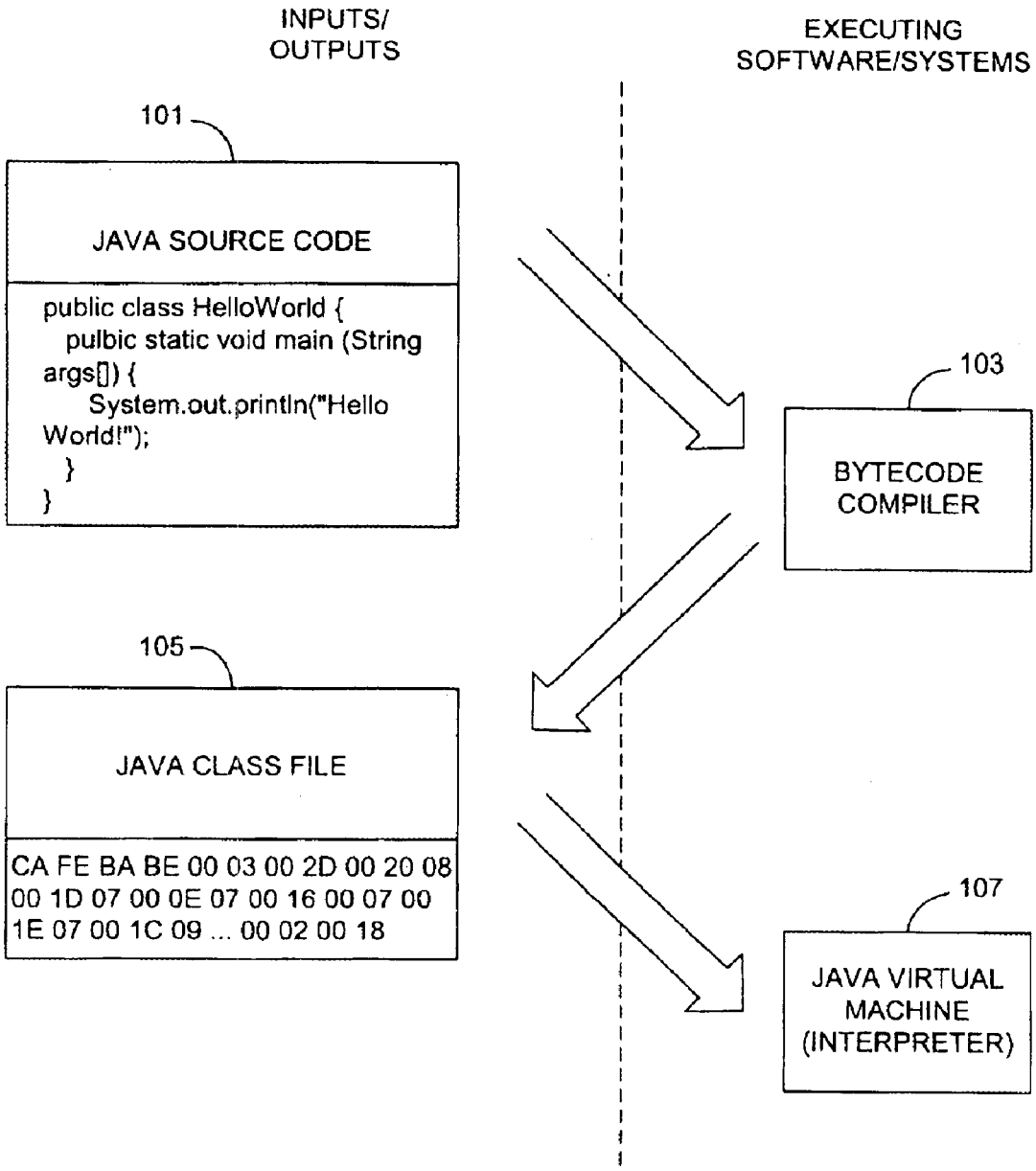
FIG. 3 shows how a Java source code program is executed.

Typically, computer programs written in the Java programming language are compiled into bytecodes or Java virtual machine instructions that are then executed by a Java virtual machine. The bytecodes are stored in class files that are input into the Java virtual machine for interpretation. FIG. 3 shows a progression of a simple piece of Java source code through execution by an interpreter, the Java virtual machine.

Java source code 101 includes the classic Hello World program written in Java. The source code is then input into a bytecode compiler 103 that compiles the source code into bytecodes. The bytecodes are virtual machine instructions as they will be executed by a software emulated computer. Typically, virtual machine instructions are generic (i.e., not designed for any specific microprocessor or computer architecture) but this is not required. The bytecode compiler outputs a Java class file 105 that includes the bytecodes for the Java program.

The Java class file is input into a Java virtual machine 107. The Java virtual machine is an interpreter that decodes and executes the bytecodes in the Java class file. The Java virtual machine is an interpreter, but is commonly referred to as a virtual machine as it emulates a microprocessor or computer architecture in software (e.g., the microprocessor or computer architecture that may not exist in hardware).

Figure 4:
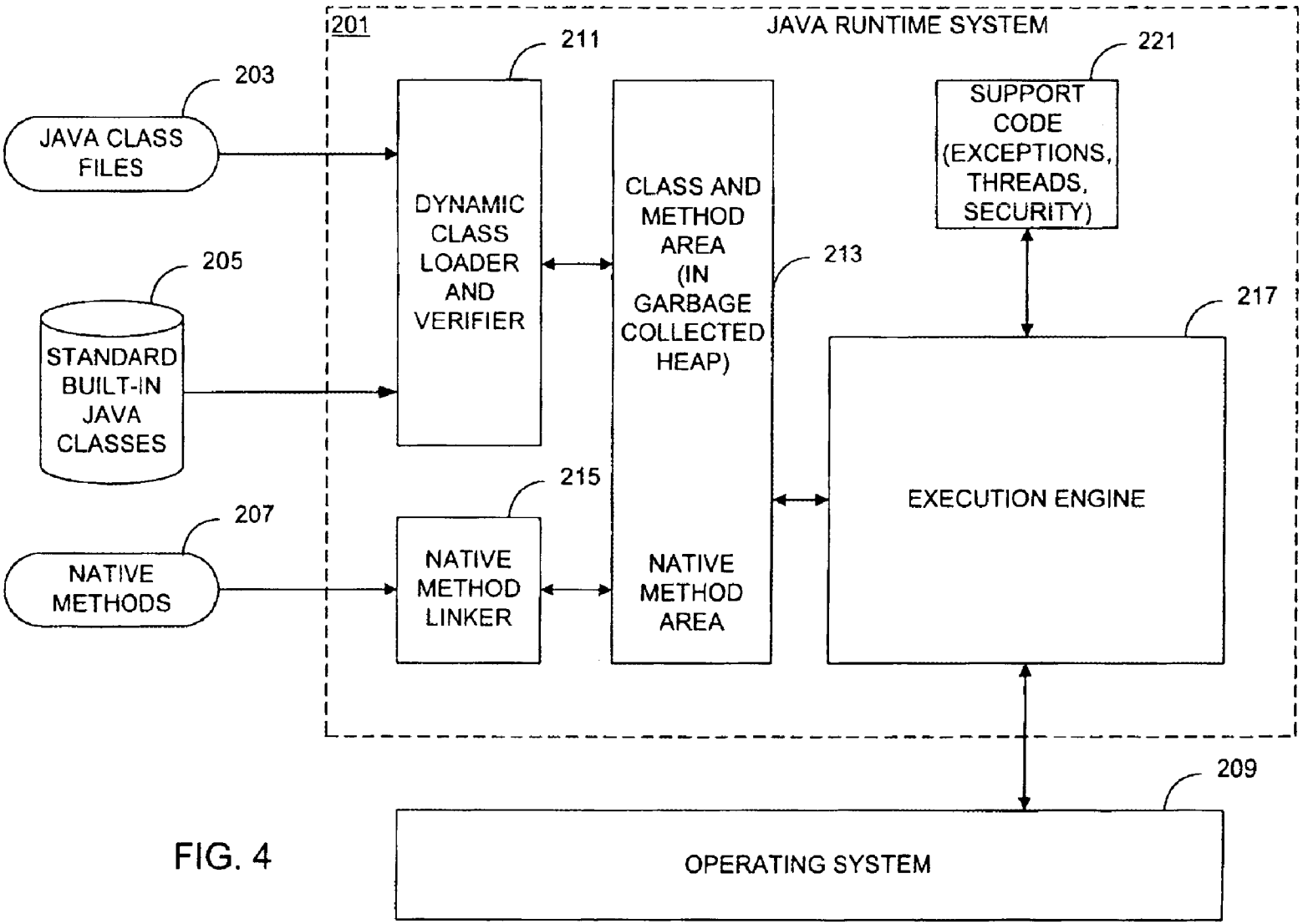
FIG. 4 shows the components of an implementation of a Java runtime system.

FIG. 4 shows the components of an implementation of a Java runtime system. Implementations of the Java virtual machine are known as Java runtime systems. A Java runtime system 201 may receive input of Java class files 203, standard built-in Java classes 205 and native methods 207 in order to execute a Java program. The standard built-in Java classes may be classes for objects such as threads, strings and the like. The native methods may be written in programming languages other than the Java programming language. The native methods are typically stored in dynamic link libraries (DLLs) or shared libraries.

The Java runtime system may also interface with an operating system 209. For example, input/output functions may be handled by the operating system, including providing the Java runtime system with interfaces to Java class files 203, standard built-in Java classes 205 and native methods 207.

A dynamic class loader and verifier 211 loads Java class files 203 and standard built-in Java classes 205 via operating system 209 into a memory 213. Additionally, the dynamic class loader and verifier may verify the correctness of the bytecodes in the Java class files, reporting any errors that are detected.

A native method linker 215 links in native methods 207 via operating system 209 into the Java runtime system and stores the native methods in memory 213. As shown, memory 213 may include a class and method area for the Java classes and a native method area for native methods. The class and method area in memory 213 may be stored in a garbage collected heap. As new objects are created, they are stored in the garbage collected heap. The Java runtime system, not the application, is responsible for reclaiming memory in the garbage collected heap when space is no longer being utilized.

At the heart of the Java runtime system shown in FIG. 4 is an execution engine 217. The execution engine carries out the instructions stored in memory 213 and may be implemented in software, hardware or a combination of the two. The execution engine supports object-oriented applications and conceptually, there are multiple execution engines running concurrently, one for each Java thread. Execution engine 217 may also utilize support code 221. The support code may provide functionality relating to exceptions, threads, security, and the like.

As a Java program executes, functions are sequentially called within each thread. For each thread there is an execution stack which stores frames for each of the functions that have not completed execution. A frame stores information for execution of the function, such information may include state variables, local variables and an operand stack. As a function is called, a frame for the function is pushed on the execution stack. When the a function terminates, the function's frame is popped off the execution stack. Accordingly, only the function corresponding to the frame on the top of the execution stack is active, the functions that correspond to frames below the top of the execution stack have had their execution suspended until the function they called returns (i.e., terminates).

Figure 5:
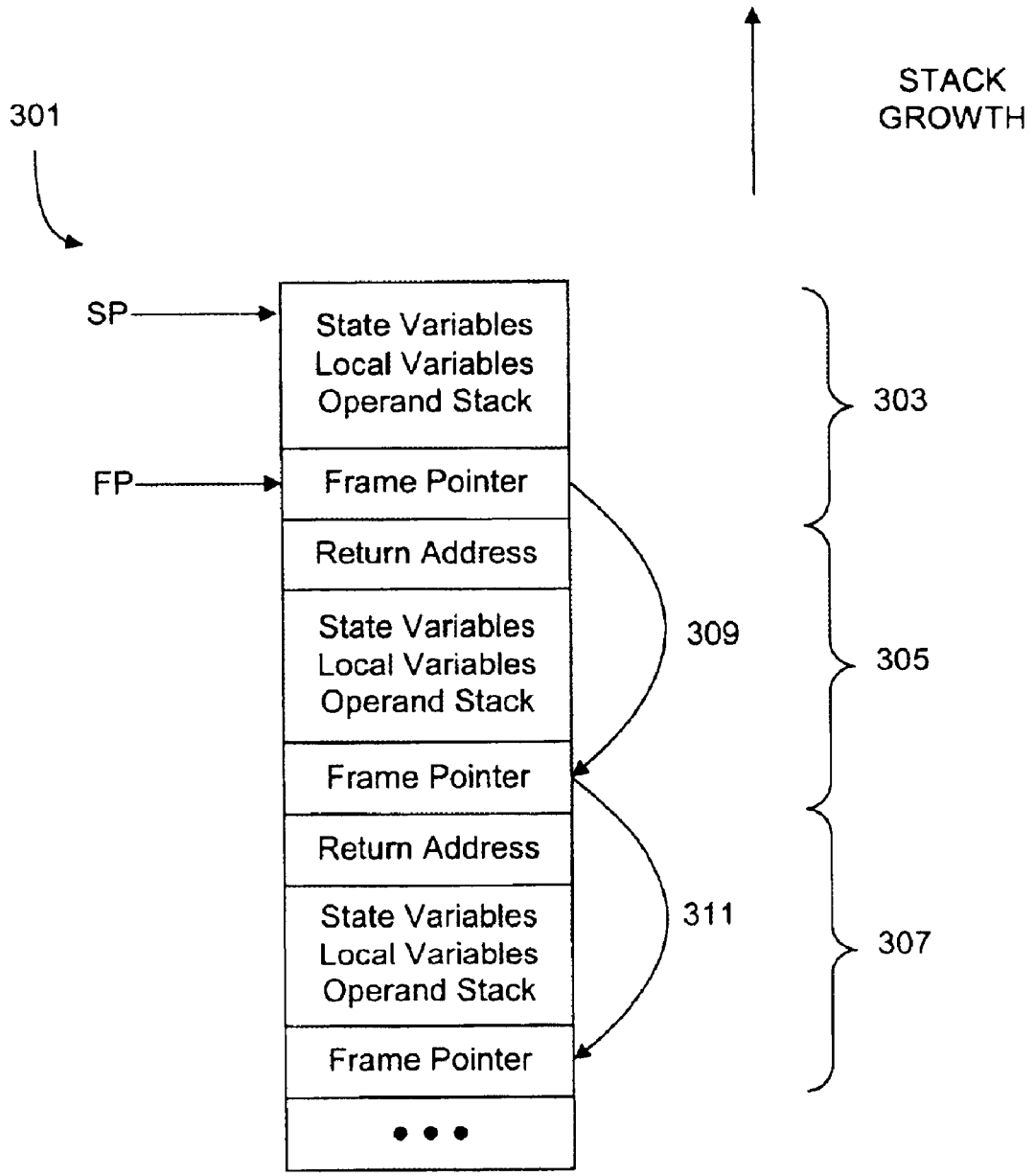
FIG. 5 illustrates frames for functions that are stored on an execution stack.

FIG. 5 illustrates frames for functions that are stored on an execution stack. An execution stack 301 is shown having a frame 303 on the top of the execution stack and frames 305 and 307 stored below frame 303, respectively. A stack pointer SP points to the top of the execution stack while a frame pointer FP points to a frame pointer in the frame on the top of execution stack 301.

Each frame is shown to include state variables, local variables and an operand stack for the function corresponding to the frame. Additionally, the last item stored in the frame is a frame pointer which points to the frame pointer in the frame below the current frame on the execution stack as shown by arrows 309 and 311.

When a function calls another function, the system first pushes the return address for the current function on execution stack 301 and then pushes a new frame for the recently called function. In this manner, when the new function returns, the system is able to pop the frame at the top of the execution stack and then pop the return address off the execution stack and set the program counter equal to this return address so that execution of the calling function may resume. Accordingly, that is the reason frames 305 and 307 include return addresses and the active frame 303 does not include a return address. However, if the function corresponding to frame 303 calls another function, the return address would be pushed on execution stack 301 before the frame for the new function is pushed on the execution stack.

The frame pointers allow the system to accurately traverse the frames on the execution stack. For example, stack pointer SP and frame pointer FP delineate the frame on the top of the execution stack. Furthermore, the frame pointer in frame 303 specifies the next frame on the execution stack. The address just below the frame pointer in frame 303 is the beginning of the next frame on the execution stack and the contents of the frame pointer of frame 303 specify the last item in the next frame on the execution stack which is frame 305. Similarly, the frame pointer in frame 305 specifies the location of the next frame on the execution stack. Therefore, the chain of frame pointers allows the system to traverse the frames on the execution stack (e.g., when the frames are popped off the execution stack).

Although FIG. 5 shows an implementation of an execution stack, the invention is not limited to the implementation shown. For example, the execution stack is shown as growing upwards in memory, however, it should be clear that the stack may also grow downwards in memory. Furthermore, the information stored in each frame may vary depending upon the implementation.

Mixed Execution Stack

The execution stack shown in FIG. 5 may perform well for functions written in the same programming language. However, if the functions are written in multiple programming languages, the organization of the execution stack shown in FIG. 5 is not satisfactory for a number of reasons. For example, the format of a frame in another programming language may be substantially different. Therefore it may not be possible to create a chain of frame pointers through frames for functions written in multiple programming languages. It may also not be known the exact size or contents of frames for functions written in other programming languages.

In order to more clearly demonstrate the problem, it may be beneficial to describe an example utilizing the execution stack shown in FIG. 5. Assume for the moment that the frames 305 and 307 are for functions that are written in a different programming language than the function for frame 303. When the function for frame 303 is executing, the contents or size of frames 305 and 307 may not be known. Therefore, even if the frame pointer of frame 303 were set to a previous frame on the execution stack for a function that is written in the same programming language as frame 303 (not shown), it may still not be known where that frame begins on the execution stack. Accordingly, these problems make it difficult to implement an execution stack that stores frames for functions written in multiple programming languages. The present invention provides implementations for execution stacks that store frames for functions written in multiple programming language and also provides other advantages as well, including improved resource allocation and exception handling.

Figure 6:
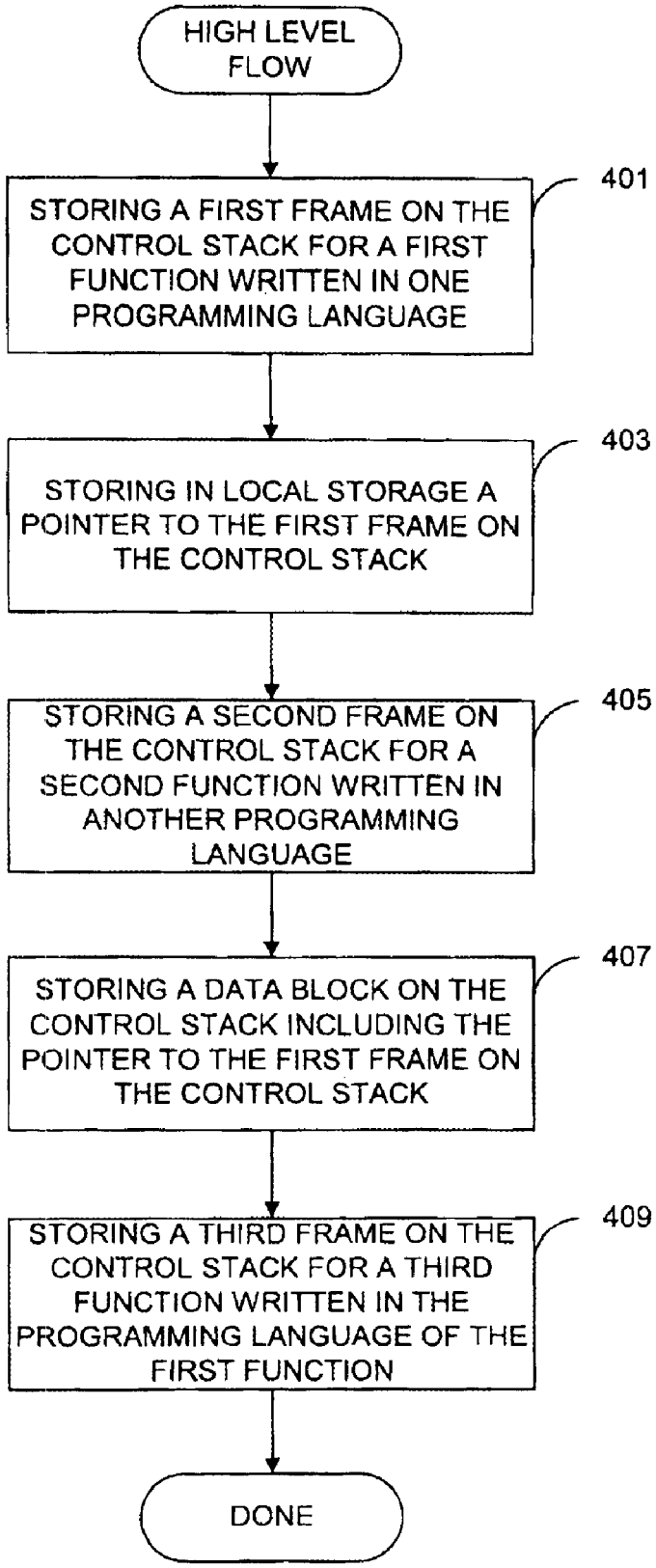
FIG. 6 shows a high level process of implementing an execution stack that stores frames for functions written in multiple programming languages.

FIG. 6 shows a high level process of storing frames on an execution stack for functions written in multiple programming languages. The process shown in FIG. 6 is at a high level and will be described in more detail in subsequent figures and the description that follows. At a step 401, the system stores a first frame on the execution stack for a first function written in one programming language.

When the first function calls a second function written in another programming language, the system stores in local storage a pointer or pointers to the first frame on the execution stack at a step 403. In preferred embodiments, the programming language of the first function is the Java programming language. Each Java thread has associated with it thread local storage so in these preferred embodiments, the local storage is the thread local storage for the thread that is executing the first and second functions. Additionally, the stack pointer and the frame pointer to the first frame are stored in the thread local storage.

At a step 405, the system stores a second frame on the execution stack for the second function written in another programming language. As an example, the other programming language may be C++programming language, Pascal, FORTRAN, assembly, and the like.

When the second function calls a third function written in the programming language of the first function, the system stores a data block (or entry frame) on the execution stack that includes the pointer or pointers to the first frame on the execution stack at a step 407. The pointer or pointers that were stored in local storage at step 403 are copied into the data block that is pushed on the execution stack above the second frame for the second function. The data block provides a mechanism for traversing the execution stack around or through the second frame on the execution stack. Although the process shown in FIG. 6 only shows a single second function written in another programming language, it should be understood that there may be many functions that are written in another programming language that call each other before the third function is called.

At a step 409, the system stores a third frame on the execution stack for the third function written in the programming language of the first function. Accordingly, the execution stack now stores frames for functions written in multiple programming language and includes mechanisms for traversing the execution stack through the frames. In order to further illustrate the process shown in FIG. 6, an execution stack that stores frames for functions written in the Java programming language and another programming language will be described in reference to FIG. 7.

Figure 7:
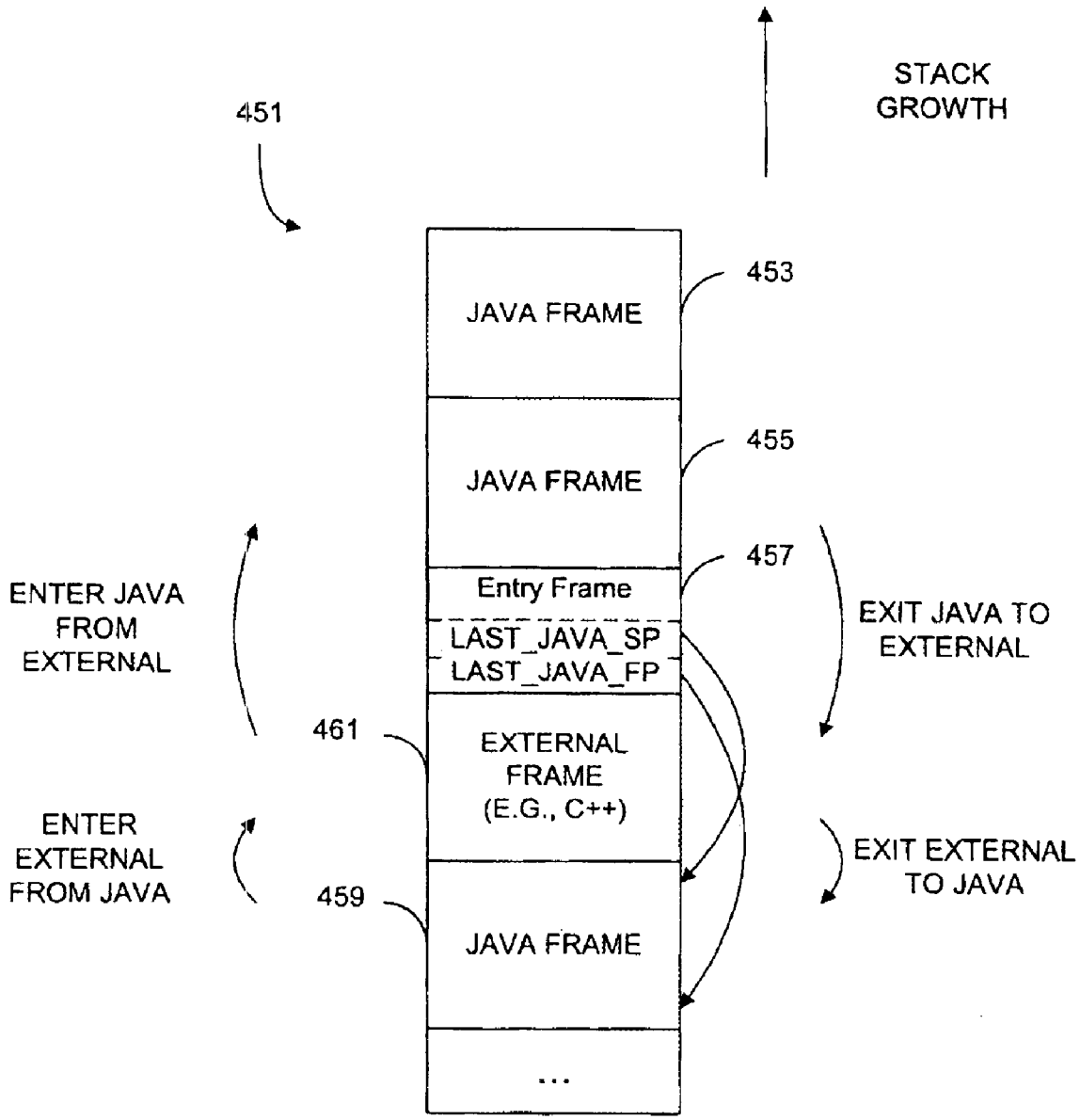
FIG. 7 shows an execution stack that stores frames for functions written in the Java programming language and another programming language.

As shown in FIG. 7, a control frame 451 stores frames for functions written in the Java programming language and external frames for functions written in programming languages other than the Java programming language (e.g., the C++programming language). A Java frame 453 is stored on the top of the execution stack and a Java frame 455 is stored below on the execution stack. For simplicity, the details of the frames are not shown, however, in preferred embodiments the details of the frames are as shown in FIG. 5.

An entry frame 457 is shown on the execution stack which stores, among other things, a LAST_JAVA_SP and a LAST_JAVA_FP that are pointers to a previous Java frame 459 on the execution stack. An external frame 461 is shown on the execution stack between entry frame 457 and Java frame 459. The external frame or frames may be for functions written in languages other than the Java programming language. As shown, the entry frame is a data block that includes at least one pointer around the external frame.

In the timeline of executing the program that has generated the execution stack shown in FIG. 7, the function corresponding to Java frame 459 is executing first. The function corresponding to Java frame 459 calls a function written in another programming language. Before the external frame for this function is pushed on the execution stack, the system stores at least one pointer to Java frame 459 in local storage.

Subsequently, the function corresponding to external frame 461 calls a Java function. In response to calling the Java function, the system pushes entry frame 457 onto the execution stack and stores therein the at least one pointer to Java frame 459 that was stored in local storage, which in this case is the LAST_JAVA_SP and the LAST_JAVA_FP. The function corresponding to Java frame 455 then calls a Java function corresponding to Java frame 453.

In order to more clearly understand the present invention, there are four distinct actions that will be described in reference to the execution stack of FIG. 7. As shown, the system may enter external code from Java code meaning that a Java function has called an external function written in another programming language. Additionally, the system may enter Java code from external code. As the Java function corresponding to Java frame 455 returns, the system exits Java code to external code and as the external function corresponding to external frame 461 returns, the system exits external code to Java code. The following will describe each of these four processes in more detail.

Figure 8:
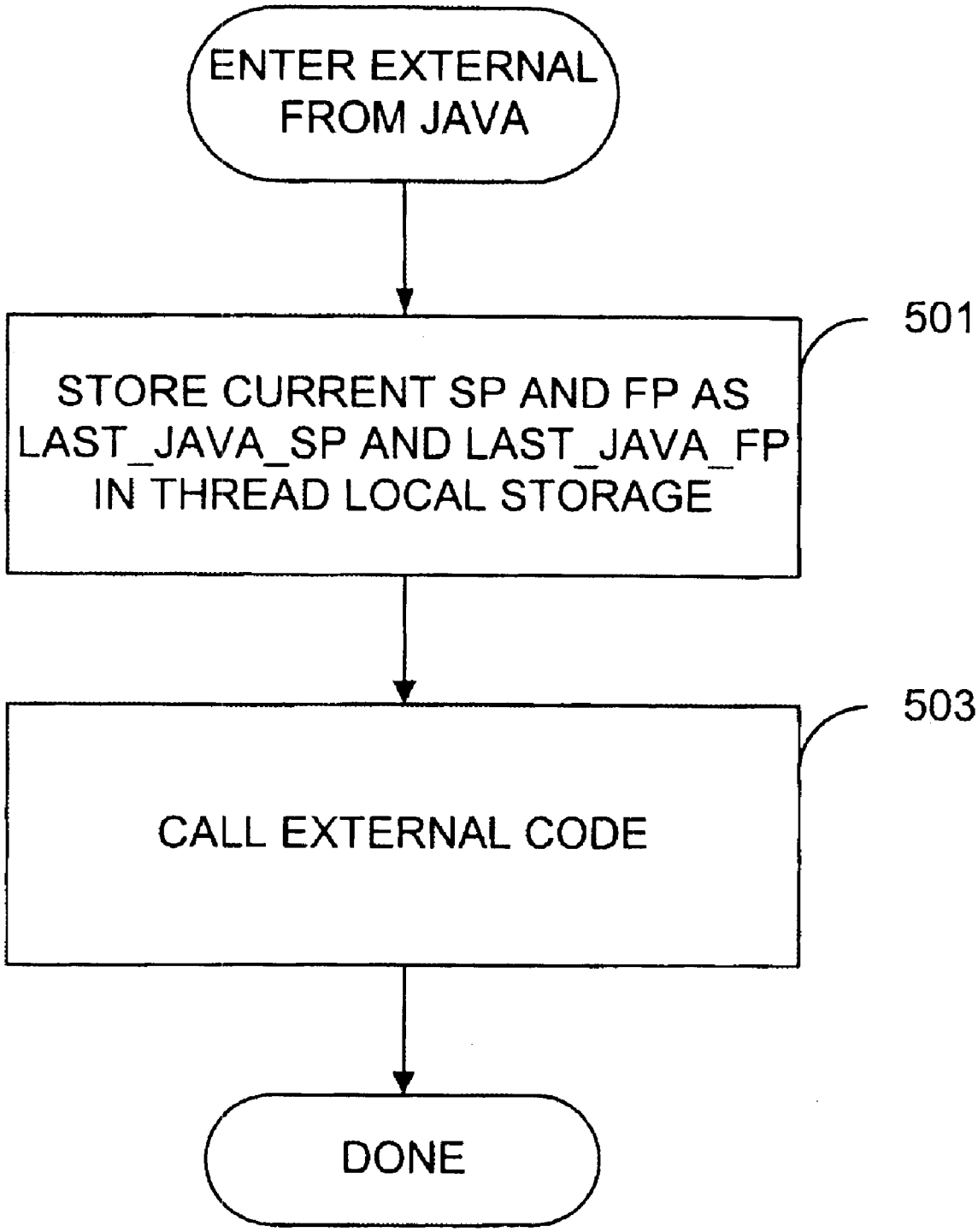
FIG. 8 shows a process of entering external code from Java code.

We will start with a Java function calling an external function. FIG. 8 shows a process of entering external code from Java code. At a step 501, the system stores the current stack pointer SP and frame pointer FP as the LAST_JAVA_SP and LAST_JAVA_FP in thread local storage. At this point it should be remembered that a Java function has called an external function. The stack pointer and frame pointer that are stored in thread local storage will be subsequently used to traverse around external frames utilizing a data block or entry frame that stores these pointers. Although preferred embodiments store both the stack pointer and frame pointer in thread local storage, the invention may be advantageously utilized storing other or fewer pointers in other storage locations.

The system then calls the external code at a step 503. At this point, the system will push an external frame for the external function on the execution stack. Before calling the external code, the system pushes the return address for the Java function on the execution stack before pushing the external frame on the top of the execution stack. Once in external code, the external function may call a Java function or call another external function that calls a Java function.

We have described a Java function calling an external function. Now, we will describe an external function calling a Java function.

Figure 9:
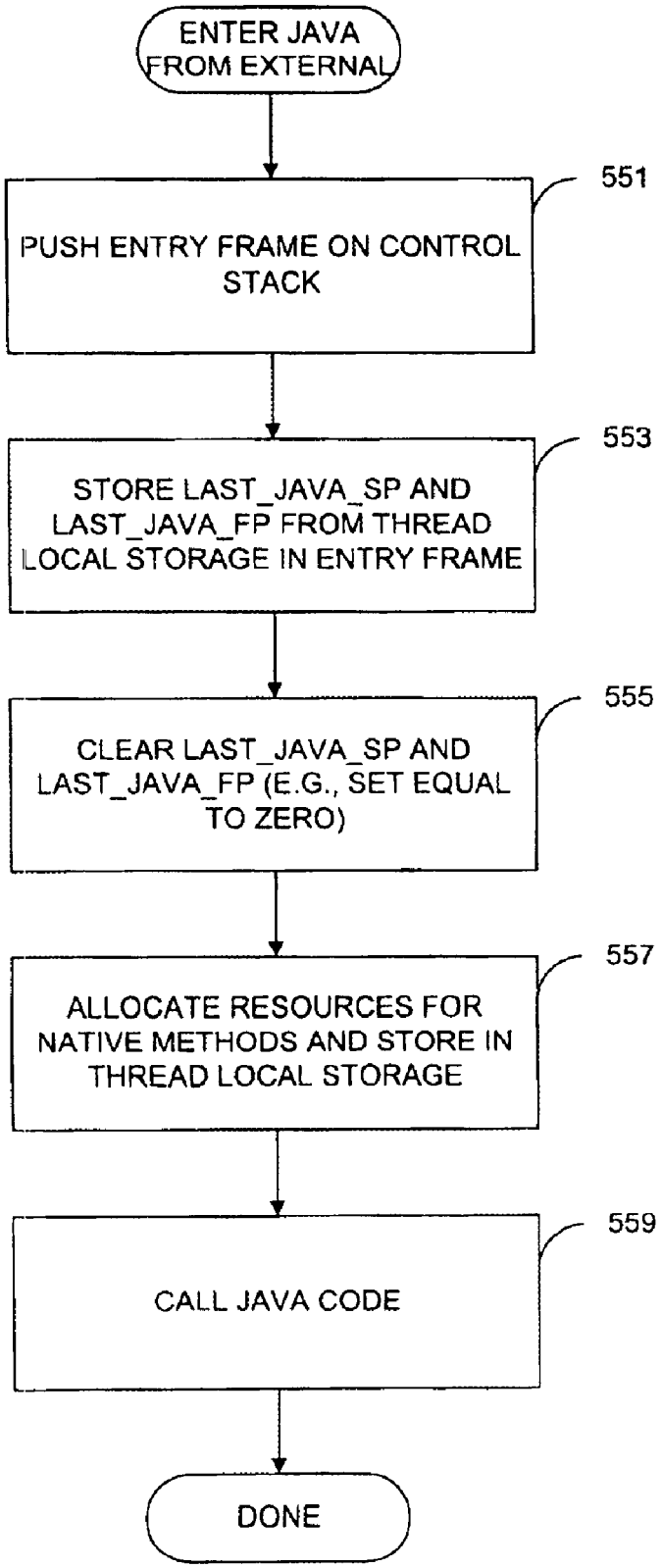
FIG. 9 shows a process of entering Java code from external code.

FIG. 9 shows a process of entering Java code from external code. Typically, the return address of the external function is pushed on the execution stack before the Java function is called. At a step 551, the system pushes an entry frame or data block on the execution stack. The LAST_JAVA_SP and LAST_JAVA_FP stored in thread local storage are then copied into the entry frame at a step 553. The LAST_JAVA_SP and LAST_JAVA_FP pointers point to a previous Java frame on the execution stack. As should be apparent to one of ordinary skill in the art, the process steps shown and described herein are provided to illustrate the invention and should not be taken to imply that any particular order of the steps is necessarily required. For example, an embodiment of the invention may first store a pointer in the entry frame before it is pushed on the execution stack and such an embodiment would clearly fall within the scope of the invention described herein.

At a step 555, the system clears the LAST_JAVA_SP and LAST_JAVA_FP stored in thread local storage. These pointers in the thread local storage may be cleared by setting their values equal to zero or any other way known to those of ordinary skill in the art. In preferred embodiments, the pointers are set equal to zero so that the pointers may be checked to determine whether Java code or external code is currently running on the system (e.g., nonzero=external and zero=Java).

In conventional systems, resources for native methods are typically allocated when the native methods are called. Oftentimes, a Java function will call multiple native methods so the conventional resource allocation results in multiple allocation and deallocation of resources. With embodiments of the invention, resources are allocated for native methods when a Java function is entered so that these resources are available to all the native methods that the Java function may call. Additionally, resources may be allocated for native methods once when the Java function is entered and deallocated once when the Java function returns thereby increasing the efficiency of resource allocation/deallocation.

At a step 557, the system allocates resources for native methods and stores the resources in thread local storage. The system then calls the Java code at a step 559.

Figure 10:
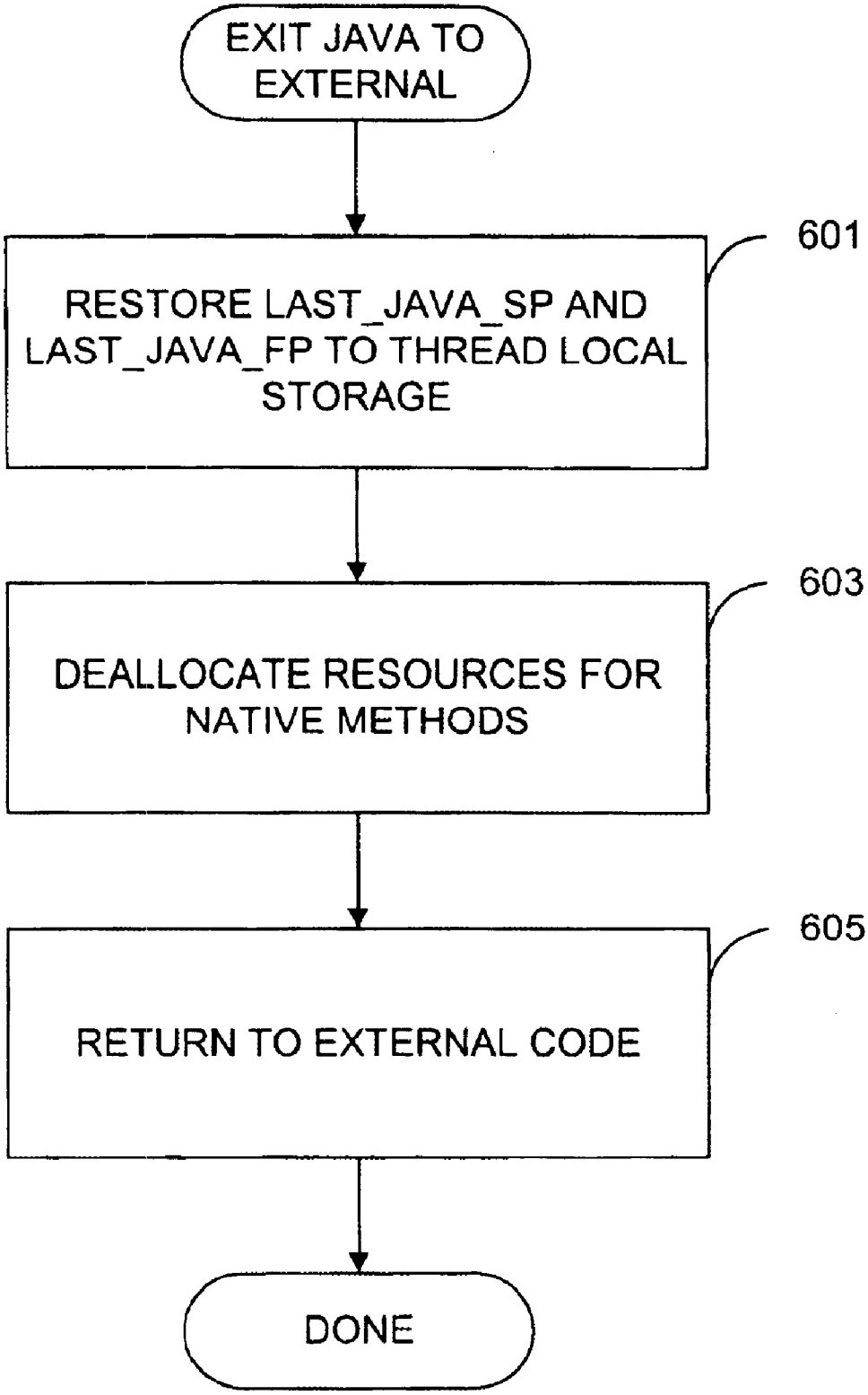
FIG. 10 shows a process of exiting Java code to external code.

After a Java function that was called by an external function returns, execution will continue with the external function that called the Java function. FIG. 10 shows a process of exiting Java code to external code. At a step 601, the system restores the LAST_JAVA_SP and LAST_JAVA_FP to thread local storage. The system copies the pointer stored in the entry frame back to the thread local storage. Accordingly, should the external function once again call a Java function, the pointers will again be available in thread local storage to set up an entry frame.

The system deallocates resources for native methods at a step 603. In preferred embodiments, the resources are stored in thread local storage after they are allocated. At a step 605, the system returns to external code that is typically designated by a return address on the execution stack.

Figure 11:
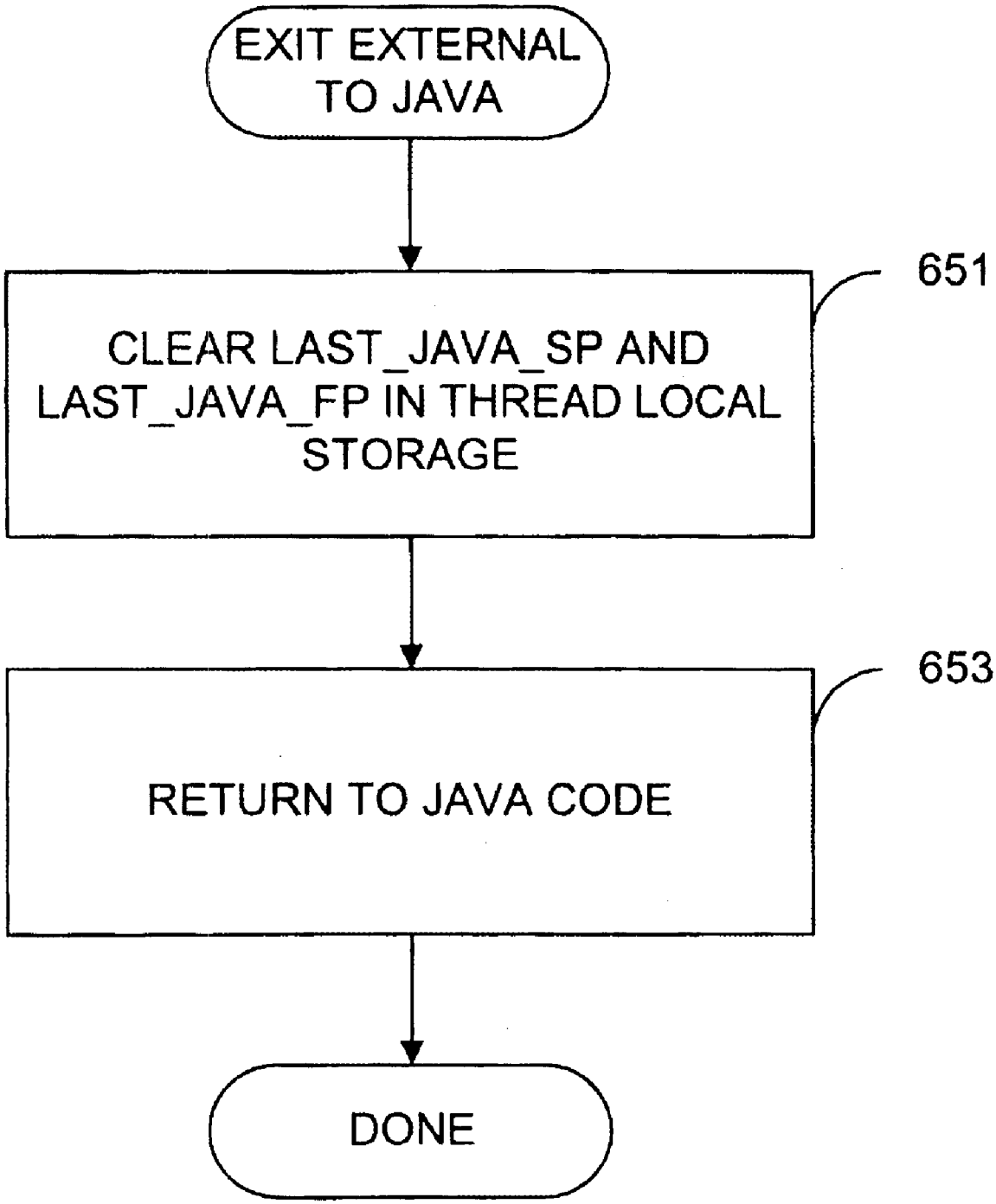
FIG. 11 shows a process of exiting external code to Java code.

Once the external function that was called by a Java function returns, execution will resume in the Java function that called the external function. FIG. 11 shows a process of exiting external code to Java code. At a step 651, the system clears the LAST_JAVA_SP and LAST_JAVA_FP in thread local storage. In preferred embodiments, the stack pointer and frame pointer stored in thread local storage are set to a zero value when the system is executing a Java function and set to a non-zero value when the system is executing external code. The stack and frame pointer are non-zero values when executing external code as the pointers point to a previous Java frame on the execution stack.

The system returns to Java code at a step 653. The system returns to Java code by setting the program counter to the return address that was pushed on the execution stack once the external function was called.

The above has shown how embodiments of the present invention provide an implementation of an execution stack that stores frames for functions written in multiple programming languages. Although the description has focused on functions for the Java programming language, the present invention is not limited to any specific programming language. The invention may be advantageously applied to systems that execute programs utilizing functions written in multiple programming languages. By allowing the system to traverse the execution stack and more efficiently allocate resources, programs may be executed more efficiently.

Exceptions

Exceptions are signals that indicate something out of the ordinary has happened. For example, an exception may indicate that the system has run out of memory or that the end-of-file of a file has been reached. Some exceptions indicate unrecoverable situations (e.g., out of memory) and some exceptions indicate recoverable situations (e.g., end-of-file).

When an exception is generated, a Java run time system typically searches for an exception handler for that exception. The search starts within the function in which the exception was thrown and then propagates through the functions on the execution stack. If an exception handler is found, the exception handler catches the exception and takes the appropriate action that may include throwing another exception.

Figure 12:
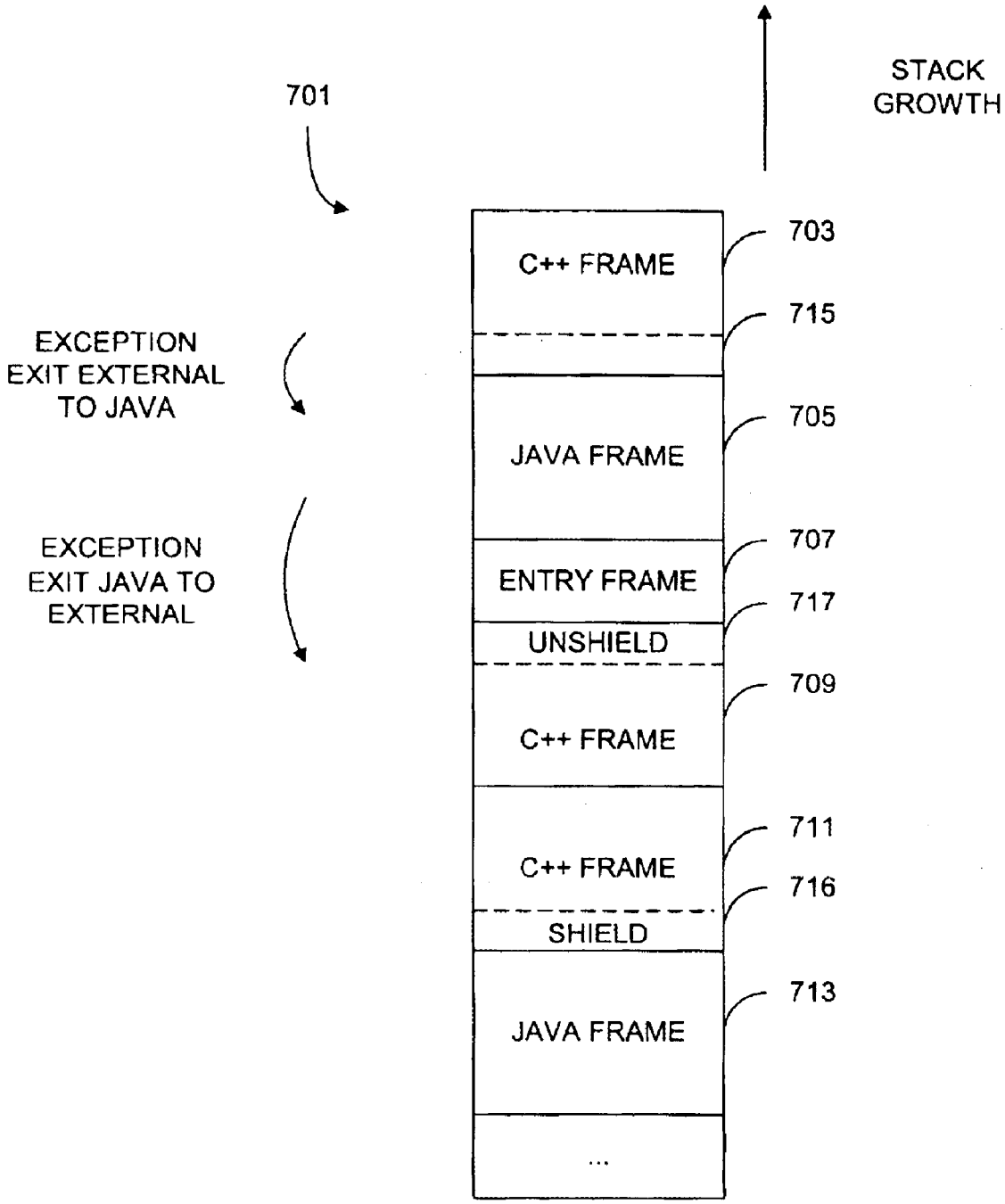
FIG. 12 illustrates an execution stack having an exception shield between a C++frame and a Java frame, and an exception unshield between the Java frame and another C++frame.

As an example, we will describe an embodiment where the Java virtual machine is written in the C++programming language. Accordingly, the execution stack will include C++frames and Java frames. With embodiments of the invention, exceptions may be propagated through the different frames on the execution stack. Although a particular embodiment is described to illustrate the invention, the invention is not limited to any particular language or configuration. FIG. 12 illustrates an execution stack including both C++and Java frames. A C++frame 703 is located on the top of the execution stack. The C++function corresponding to C++frame 703 was called by a Java function corresponding to a Java frame 705. As described previously, an entry frame 707 is stored on the execution stack to allow the system to traverse C++frames 709 and 711 to a Java frame 713.

Conceptually there is a shield 715 between C++frame 703 and Java frame 705. Shield 715 catches C++exceptions that are not handled in C++frame 703 and passes the exception to Java frame 705. It may be necessary to transform the C++exception to a Java exception before the exception is passed on. As shown, there may also be a shield 716 between C++frame 711 and Java frame 713.

An unshield 717 is between Java frame 705 (and entry frame 707) and C++frame 709. Unshield 717 passes Java exceptions that are not handled within Java frame 705 and passes them on to C++frame 709. The execution stack shown in FIG. 12 has now been briefly described so it may be beneficial to describe a process of an exception exiting external code to Java code.

Figure 13A:
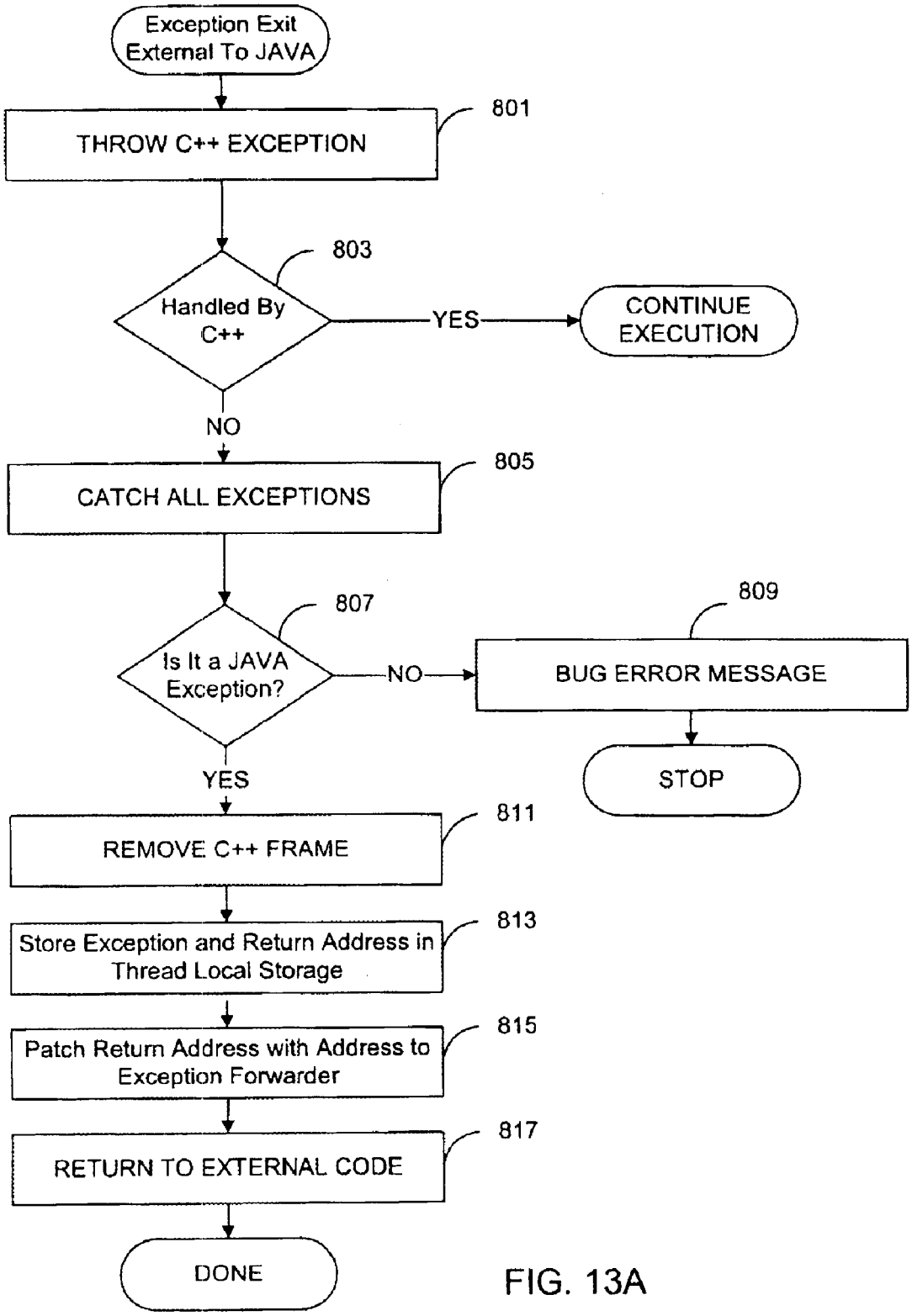
FIGS. 13A and 13B show a process of an exception exiting external code to Java code.
Figure 13B:
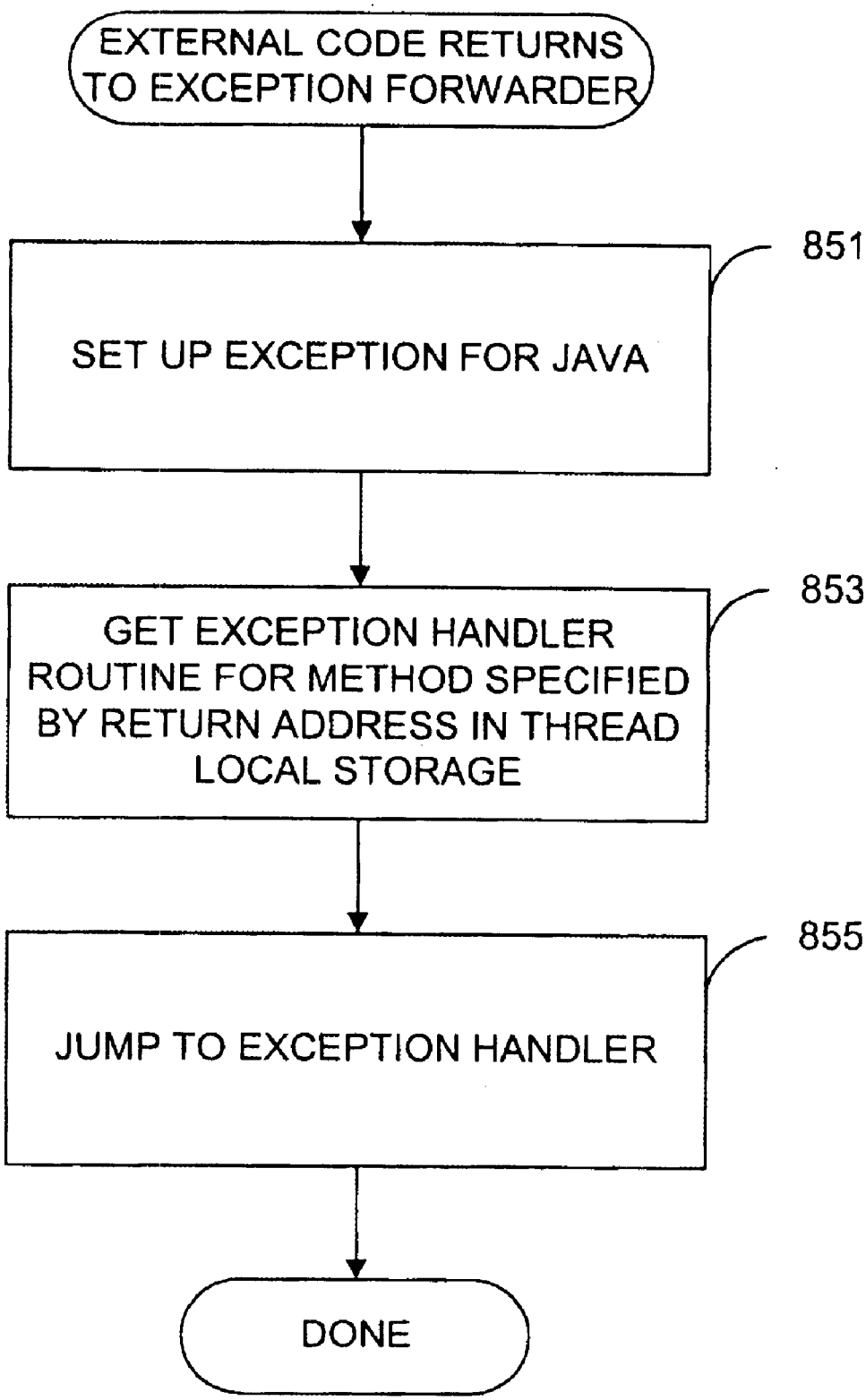

FIGS. 13A and 13B show a process of an exception exiting external code to Java code. At a stop 801, a C++exception has been thrown. The C++exception may be caught and handled by an appropriate exception handler as is known in the art. If the C++exception is handled by an exception handler at a step 803, the system continues execution as directed by the exception handler.

Steps 805 and the subsequent steps 807, 809, 811, 813, 815, and 817 correspond to shield 715 of FIG. 12. At a step 805, the system catches all the exceptions that were not handled within the C++frame. The system then determines if the caught exception is a Java exception at a step 807. In other words, the system determines if the C++exception may be translated into a Java exception. If the C++exception may not be transformed into a Java exception, the system may issue a bug error message at a step 809 and halt execution.

If the C++exception is a Java exception, the system removes the C++frame from the top of the execution stack at a step 811. The C++frame corresponds to the C++function that was running when the exception was thrown. The system stores the exception and a return address in thread local storage at a step 813. The stored return address may be utilized to generate a Java exception.

At a step 815, the system patches the return address on the execution stack with an address to an exception forwarder. The exception forwarder is external code of a virtual machine function (written in C++or assembly in preferred embodiments) that is responsible for generating a Java exception and jumping to the exception handler for the next Java frame on the execution stack.

At a step 817, the system returns to external code. Now that the return address for Java frame 705 has been patched at step 815 to refer to the exception forwarder, the system will next execute the exception forwarder function which is shown in FIG. 13B. FIG. 13B shows an embodiment of the exception forwarder. At a step 851, the system sets up a Java exception. A Java exception includes both an exception object and a program counter (or "issuing PC") where the exception was thrown. The program counter may be readily generated from the return address stored in thread local storage by simply subtracting one from the return address. Although the embodiment described stores the return address, it should be readily apparent that the issuing PC could also be stored in thread local storage.

Utilizing the return address stored in thread local storage, the exception forwarder gets the exception handler routine for the method specified by the return address. After the appropriate exception handler is identified, a jump is performed to the exception handler at a step 855. Accordingly, it has been shown how a C++exception may be translated and handled as a Java exception. The following will describe an exception exiting Java code to external code.

Figure 14A:
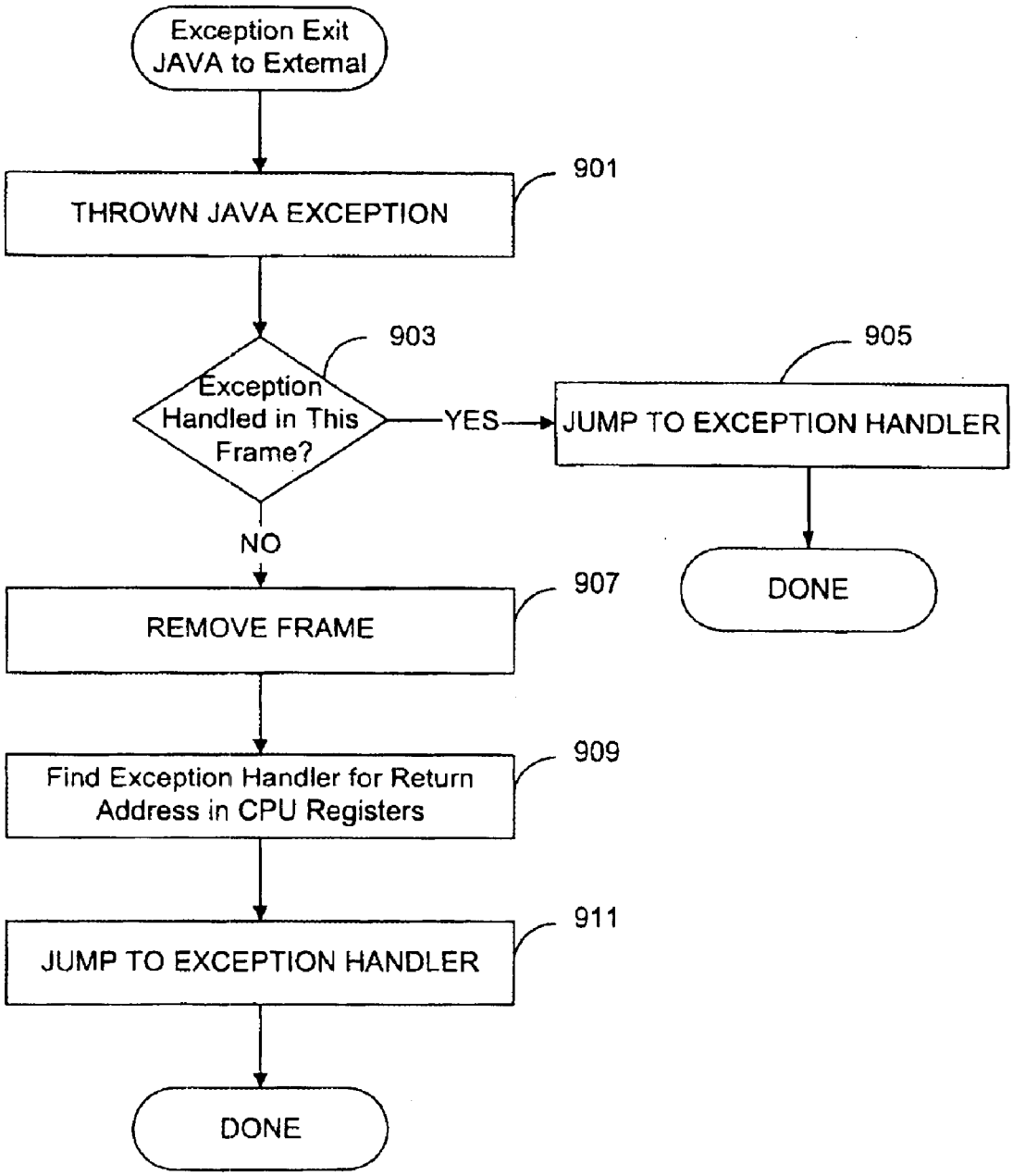
FIGS. 14A and 14B show a process of an exception exiting Java code to external code.
Figure 14B:
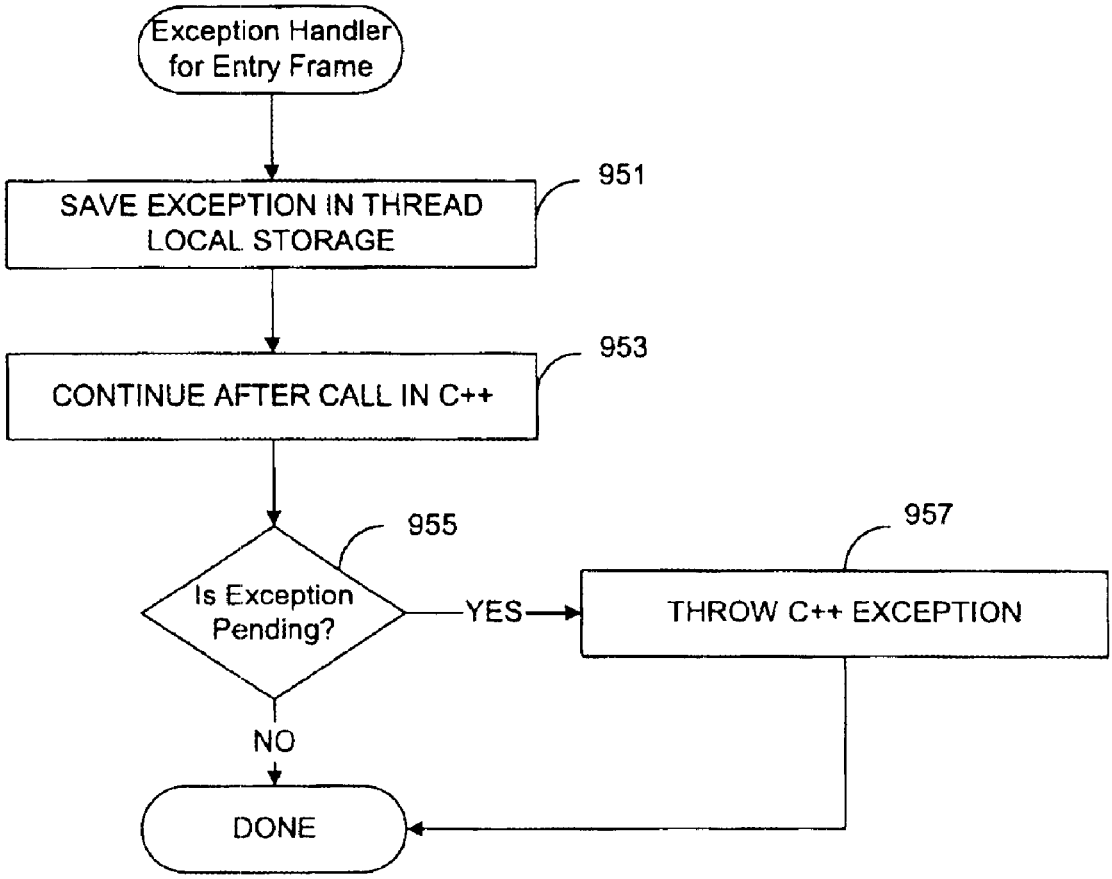

FIGS. 14A and 14B show a process of an exception exiting Java code to external code. At a step 901, a Java exception has been thrown. The system determines if the exception may be handled in the current Java frame at a step 903. If the exception may be handled by an exception handler for this frame, the system jumps to that exception handler at a step 905.

If the Java exception may not be handled by the exception handler for this Java frame, the system removes the Java frame from the execution stack at a step 907. The system then finds the exception handler for the return address stored in the CPU registers at a step 909. At a step 911, the system jumps to the exception handler. The exception handler will be the exception handler for the entry frame.

FIG. 14B shows a process for the exception handler of the entry frame. At a step 951, the exception handler saves the exception in thread local storage. The exception handler finishes execution and continues after the call in C++at step 953. When execution begins after the call in C++, the unshield shown as unshield 717 in FIG. 12 determines if an exception is pending at a step 955. It may be determined that an exception is pending by checking local storage to see if an exception is pending. For example, it may be determined whether an exception is stored in thread local storage. If an exception is pending, a C++exception may be thrown at a step 957 by throwing the exception stored in thread local storage. Accordingly, a Java exception has been transformed and rethrown as a C++exception.

Figure 15:
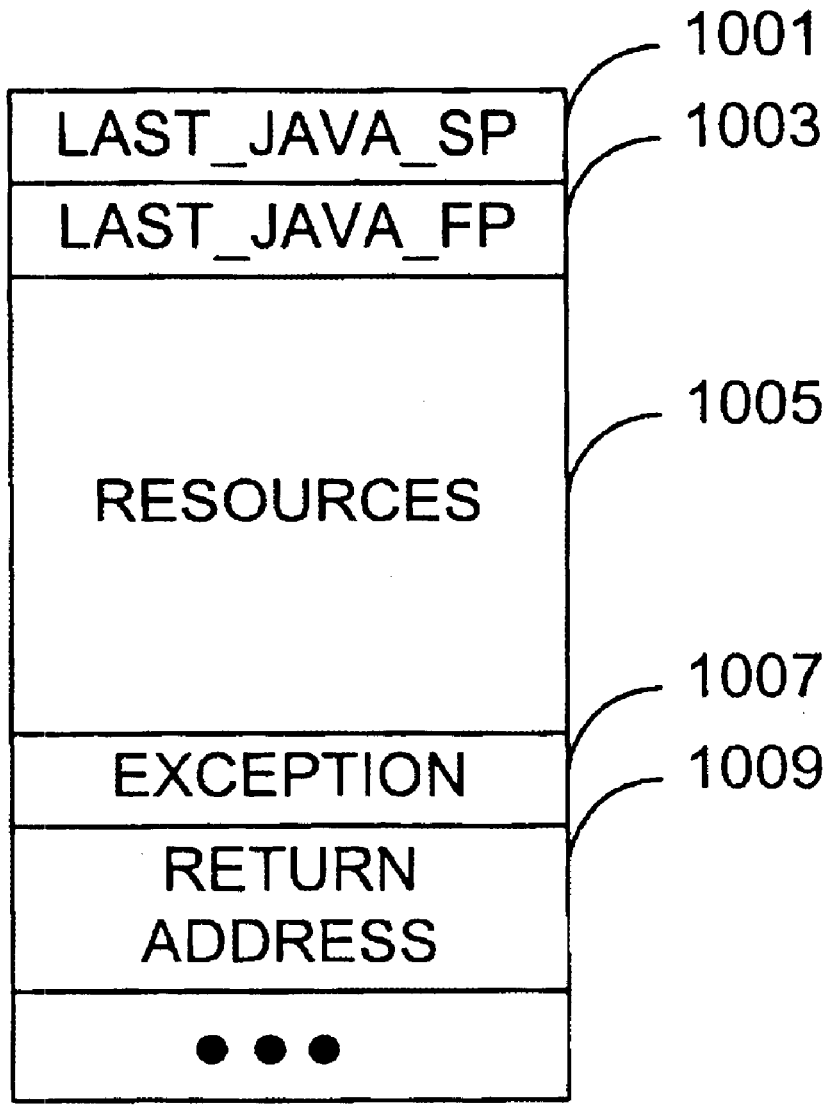
FIG. 15 shows information that may be stored in thread local storage in order to implement an execution stack that stores frames for functions written in multiple programming languages.

The embodiments described above has shown that information may be stored in thread local storage in order to implement an execution stack that stores frames for functions written in multiple programming languages. FIG. 15 shows the information that may be stored in thread local storage. The information has been described above in reference to the other figures; however, it may be beneficial to review the information that may be stored therein. A LAST_JAVA_SP 1001 and LAST_JAVA_FP 1003 are pointers to a previous Java frame on the execution stack. These pointers allow the execution stack to be traversed around or through frames on the execution stack written in other programming languages.

Resources 1005 are allocated when the system enters a Java function from a function written in another programming language. The resources may then be utilized by any native methods called by the Java function or any subsequent Java functions.

An exception 1007 and a return address 1009 are stored to allow exceptions to pass from a function written in another programming language (e.g., the C++programming language) to a Java function, and vice versa. Other information may also be stored in thread local storage.

Conclusion

While the above is a complete description of preferred embodiments of the invention, there are alternatives, modifications, and equivalents that may be used. It should be evident that the invention is equally applicable by making appropriate modifications to the embodiments described above. For example, the embodiments described have been in reference to a mixed execution stack including Java frames, but the principles of the present invention may be readily applied to other systems and languages. Therefore, the above description should not be taken as limiting the scope of the invention that is defined by the meets and bounds of the impended claims along with their full scope of equivalents.

What is claimed is:

1. In a computer system, a method for [allocating] *pre-allocating* resources for functions written in a plurality of programming languages, the method comprising:

storing a first frame on [the] *an* execution stack for a first function, the first function being written in a first programming language; and calling a second function using the first function, *the second function being written in a second programming language*; and allocating resources for functions written in programming languages other than [a] *the* second programming language that may be called by the second function.

2. The method of claim 1, further comprising upon exiting the second function, deallocating the resources for functions written in programming languages other than the second programming language.

3. The method of claim 1 wherein calling the second function using the first function includes executing the second function, the method further including catching an exception that was raised during execution of the second function that was not handled by an exception handler for the second function.

4. The method of claim 3 further including:

identifying an exception handler for the data block to handle the exception; and jumping from the second function to the identified exception handler.

5. The method of claim 4 wherein the identified exception handler stores the exception in a local storage associated with a thread which causes the second function to be called using the first function.

6. The method of claim 5 further including:

returning to the first function from the second function; and checking the local storage to determine whether an exception is pending; and throwing the stored exception when it is determined that the exception is pending.

7. In a computer system, a method for handling exceptions for functions written in a plurality of programming languages, the method comprising:

storing a first frame on [the] *an* execution stack for a first function, the first function being written in a first programming language;

calling a second function with a first function, *the second function being written in a second programming language*; and catching an exception that was raised during execution of the second function that was not handled by an exception handler for the second function*; and*

*determining if the exception can be translated*.

8. The method of claim 7, further comprising identifying an exception handler for the data block to handle the exception and jumping to the identified exception handler.

9. The method of claim 8, wherein the identified exception handler stores the exception in local storage.

10. The method of claim 9, wherein the local storage is storage associated with a current thread in which the first and second functions are executing.

11. The method of claim 9, further comprising upon returning to the first function, checking the local storage to determine if an exception is pending and throwing the stored exception if an exception is pending.

12. The method of claim 11, further comprising converting the stored exception to a format for the first programming language.

13. The method of claim 7 wherein calling the second function with the first function includes storing a data block on the execution stack, the data block including a reference to another frame on the execution stack for a third function not written in the first programming language.

14. In a computer system, a method for implementing an execution stack that stores frames for functions written in a plurality of programming languages, the method comprising:

storing a first frame on the execution stack for a first function, the first function being written in a first programming language;

storing a second frame on the execution stack for a second function, the second function being written in a second programming language; and calling a third function from the second function, the third function being written in the first programming language, wherein calling the third function from the second function includes storing a data block on the execution stack that includes at least one reference to the first frame.

15. The method of claim 14 further including storing the data block on the execution stack before a third frame for the third function.

16. The method of claim 14 wherein the first programming language is the Java programming language.

17. The method of claim 16 wherein the second programming language is one selected from the group consisting of the C++programming language, the Pascal programming language, the FORTRAN programming language, and an assembly language.

*18. A method of implementing a mixed execution stack that can support a plurality of different programming languages in a computing environment, said method comprising:*

*storing a first frame on said mixed execution stack, wherein said first frame is a frame for execution of computer program code written in a first programming language;*

*determining whether a second frame for execution of computer program code written in a second programming language is to be stored on said mixed execution stack, wherein said first and second programming languages are not the same programming language; and*

*storing at least one reference to said first frame when said determining determines that said second frame for execution of said computer program code written in said second programming language is to be stored on said mixed execution stack.*

*19. A method as recited in claim 18, wherein said method further comprises:*

*storing said second frame on said mixed execution stack.*

*20. A method as recited in claim 18, wherein said method further comprises:*

*storing said second frame on said mixed execution stack after said storing of at least one reference to said first frame.*

*21. A method as recited in claim 18, wherein said method further comprises:*

*determining whether a third frame associated with said first programming language is to be stored on said mixed execution stack; and*

*storing said at least one reference to said first frame on said execution stack when said determines that said third frame is to be stored on said mixed execution stack.*

*22. A method as recited in claim 18, wherein said method further comprises:*

*determining whether a third frame associated with said first programming language is to be stored on said mixed execution stack; and*

*storing an entry frame on said execution stack before said third frame is stored on said mixed execution stack.*

*23. A method as recited in claim 18, wherein said storing of said at least one reference to said first frame comprises:*

*storing said at least one reference to a local storage.*

*24. A method as recited in claim 18, wherein said storing of said at least one reference to said first frame comprises:*

*storing said at least one reference to a local storage before storing said at least one reference on said execution stack.*

*25. A method as recited in claim 18, wherein said first or second programming language is the Java programming language.*

*26. A virtual machine capable of using a mixed execution stack that can support a plurality of different programming languages in a computing environment, said virtual machine is capable of:*

*storing a first frame on said mixed execution stack, wherein said first frame is a frame for execution of computer program code written in a first programming language;*

*determining whether a second frame for execution of computer program code written in a second programming language is to be stored on said mixed execution stack, wherein said first and second programming languages are not the same programming language; and*

*storing at least one reference to said first frame when said determining determines that said second frame for execution of said computer program code written in said second programming language is to be stored on said mixed execution stack.*

*27. A virtual machine as recited in claim 25, wherein said virtual machine is further capable of:*

*storing said second frame on said mixed execution stack.*

*28. A virtual machine as recited in claim 25, wherein said virtual machine is further capable of:*

*storing said second frame on said mixed execution stack after said storing of at least one reference to said first frame.*

*29. A virtual machine as recited in claim 25, wherein said virtual machine is further capable of:*

*determining whether a third frame associated with said first programming language is to be stored on said mixed execution stack; and*

*storing said at least one reference to said first frame on said execution stack when said determines that said third frame stored on said mixed execution stack.*

*30. A virtual machine as recited in claim 25, wherein said first or second programming language is the Java programming language.*

*31. A virtual machine for preallocating resources for functions written in a plurality of programming languages, wherein said virtual machine is capable of:*

*storing a first frame on the execution stack for a first function, the first function being written in a first programming language; and*

*calling a second function using the first function, the second function being written in a second programming language; and*

*allocating resources for functions written in programming languages other than a second programming language that may be called by the second function.*

*32. A virtual machine as recited in claim 31, wherein said virtual machine is further capable of:*

*upon exiting the second function, deallocating the resources for functions written in programming languages other than the second programming language.*

*33. A virtual machine for handling exceptions for functions written in a plurality of programming languages, wherein said virtual machine is capable of:*

*storing a first frame on the execution stack for a first function, the first function being written in a first programming language;*

*calling a second function with a first function, the second function being written in a second programming language;*

*catching an exception that was raised during execution of the second function that was not handled by an exception handler for the second function; and*

*determining if the exception can be translated.*

*34. A virtual machine as recited in claim 33, wherein said virtual machine is further capable of:*

*identifying an exception handler for the data block to handle the exception; and*

*jumping to the identified exception handler.*

*35. A virtual machine for implementing an execution stack that stores frames for functions written in a plurality of programming languages, wherein said virtual machine is capable of:*

*storing a first frame on the execution stack for a first function, the first function being written in a first programming language;*

*storing a second frame on the execution stack for a second function, the second function being written in a second programming language; and*

*calling a third function from the second function, the third function being written in the first programming language, wherein calling the third function from the second function includes storing a data block on the execution stack that includes at least one reference to the first frame.*

*36. A virtual machine as recited in claim 35, wherein said virtual machine is further capable of:*

*storing said data block on the execution stack before a third frame for the third function.*

*37. A virtual machine as recited in claim 35, wherein said first programming language is the Java programming language.*

*38. A virtual machine as recited in claim 35, wherein the second programming language is one selected from the group consisting of the C++programming language, the Pascal programming language, the FORTRAN programming language, and an assembly language.*

* * * * *